United States Patent [19]

Pinson

[11] 4,397,113
[45] Aug. 9, 1983

[54] FISHING ROD HOLDER AND HOOK SETTING DEVICE

[76] Inventor: Paul I. Pinson, Box 67, Winnsboro, Tex. 75494

[21] Appl. No.: 232,669

[22] Filed: Feb. 9, 1981

[51] Int. Cl.³ .............................................. A01K 91/06
[52] U.S. Cl. ........................................................ 43/15
[58] Field of Search ..................................... 43/15, 16

[56] References Cited

U.S. PATENT DOCUMENTS

| | | | |
|---|---|---|---|
| 2,689,426 | 9/1954 | Baenen | 43/15 |
| 2,918,746 | 12/1959 | Hamrick | 43/15 |
| 3,007,275 | 11/1961 | Standley | 43/15 |
| 3,016,648 | 1/1962 | Ingersoll et al. | 43/15 |
| 3,619,931 | 11/1971 | Brummett | 43/15 |
| 3,672,085 | 6/1972 | King | 43/15 |
| 3,813,805 | 6/1974 | Baumstark | 43/15 |

*Primary Examiner*—Nicholas P. Godici
*Assistant Examiner*—Charles L. Willis
*Attorney, Agent, or Firm*—Dennis T. Griggs

[57] ABSTRACT

A fishing rod holder features an automatic hook setting mechanism which is adjustable over a wide range thereby making it suitable for use with both heavy and light tackle, and for stationary use or trolling. The fishing rod holder includes an elongated rod retainer which is pivotally coupled to a support member such as a ground engaging stake or the sidewall of a boat. The fishing rod is carried in a generally horizontal position on top of the rod retainer by a cup which receives the butt of the fishing rod and a guide bar which supports and confines an intermediate portion of the fishing rod. According to an important feature of the invention, the guide bar is spring biased for yieldably resisting downward movement relative to the rod retainer, thereby preventing the triggering mechanism from being actuated by the weight of the fishing rod. The rod retainer is held in a cocked position by a latch which is pivotally mounted on the support member. The latch is released by an elongated trigger arm which is attached on one end to the guide bar and which is movably coupled at its opposite end to the latch. The trigger arm includes a cam for movably engaging the latch, and has an intermediate portion which holds the cam in a vertically offset and transversely extended position with respect to the guide bar whereby downward movement of the guide bar, in response to a strike, is converted into rotation of the cam against the latch.

8 Claims, 6 Drawing Figures

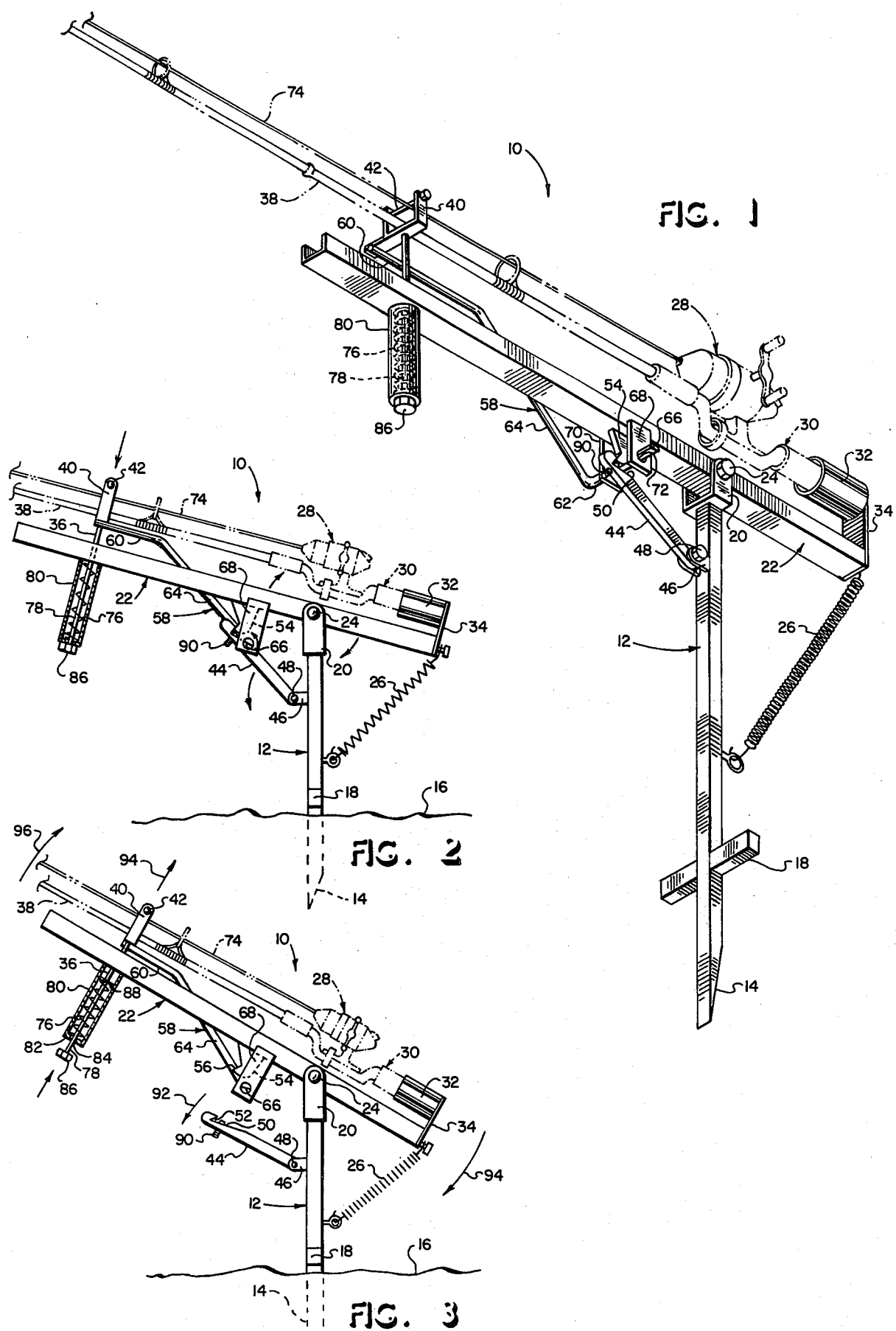

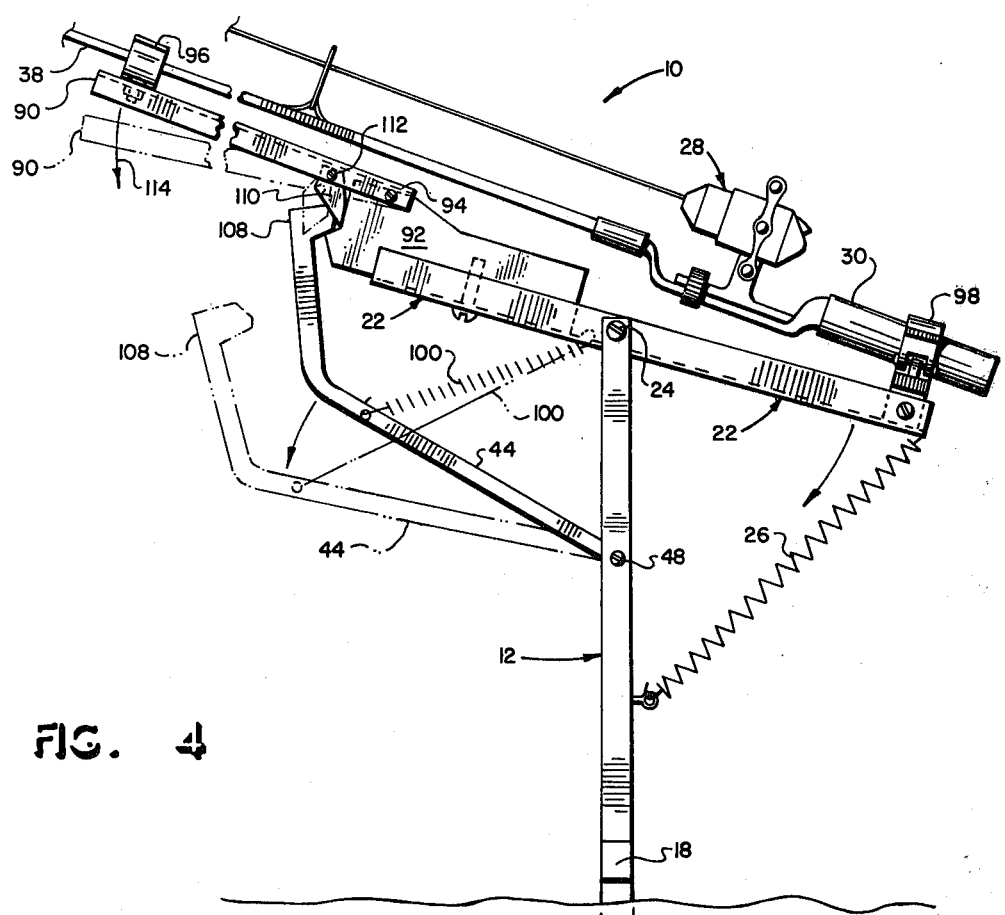
FIG. 4
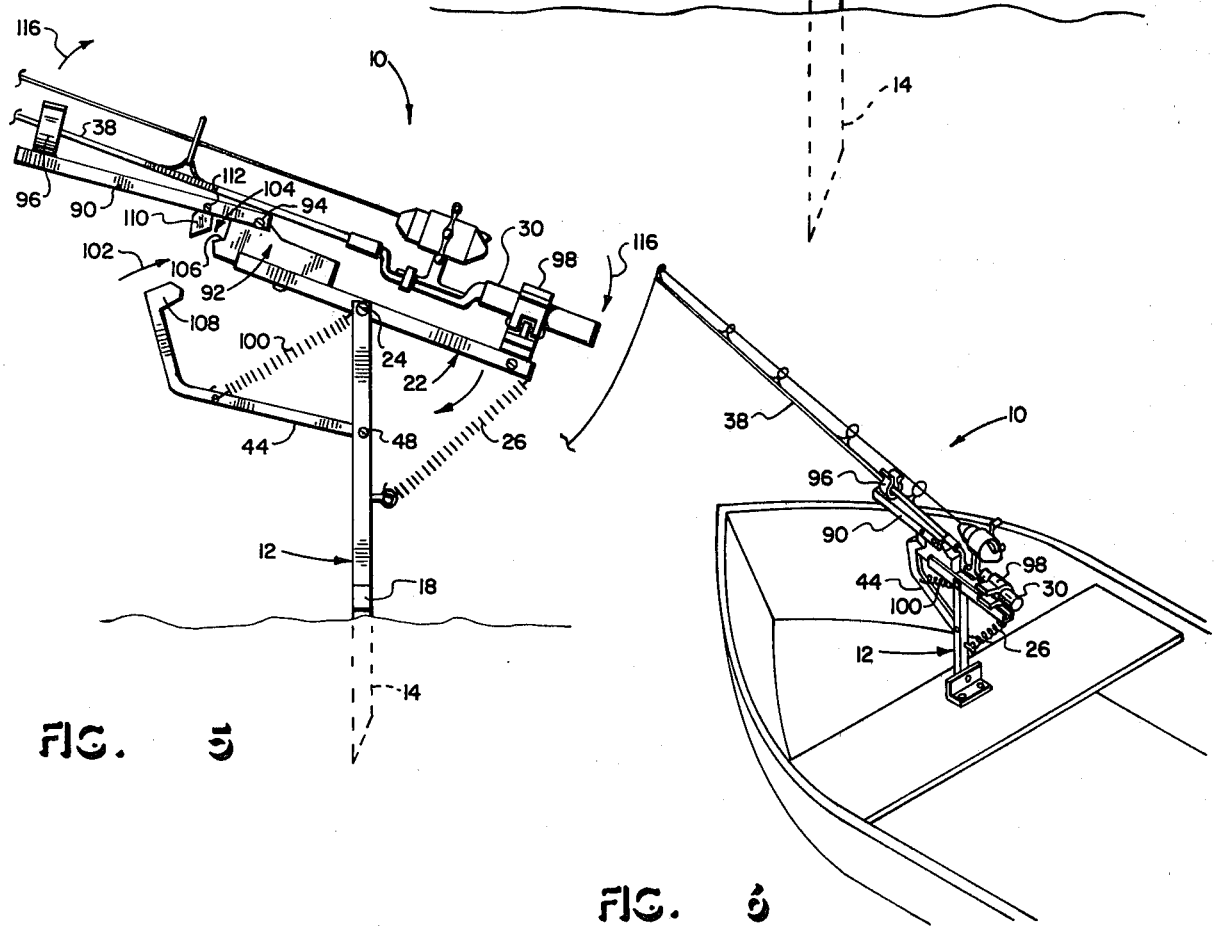
FIG. 5
FIG. 6

FISHING ROD HOLDER AND HOOK SETTING DEVICE

BACKGROUND OF THE INVENTION

1. Field of the Invention

The present invention relates to fishing rod holders of the type including an automatic hook setting mechanism.

2. Description of the Prior Art

Fishing rod holders which include automatic hook setting devices are known for use on the bank of a river, stream or pond, or for ice fishing, or for use on the side of a boat or barge. The majority of such arrangements usually include a holder for the fishing rod, a spring of some type, and a triggering mechanism which releases the spring to lift the fishing rod and thereby set the hook. The various improvements which have been proposed for the spring loaded rod holder have been concerned with improving the cocking mechanism and the means for tripping the latching mechanism for reliably maintaining the rod holder in a cocked position without being affected by variations in rod weight or by loading induced by wave action or by the wind. Generally, other improvements have been related to the portability of the assembly, the ease of setting it up and cocking it, and the adjustment of its sensitivity whereby it can be used with relatively heavy tackle or light tackle, and for stationary fishing or for trolling.

OBJECTS OF THE INVENTION

The principal object of the present invention is to provide an improved fishing rod holder having an automatic hook setting mechanism which is adaptable for use with relatively heavy tackle as well as light tackle.

A related object of the invention is to provide a fishing rod holder having an automatic fish hook setting mechanism which can be adjusted over a wide tripping force range so that, depending upon its adjustment, it will be responsive to relatively light strikes, as in crappie fishing or ice fishing, or responsive only to relatively heavy strikes, as for example, when trolling for relatively large game fish such as striped bass.

SUMMARY OF THE INVENTION

The fishing rod holder of the present invention features an automatic hook setting mechanism which is adjustable over a wide range making it suitable for use with both heavy and light tackle, and for stationary or trolling use. The fishing rod holder includes an elongated rod retainer which is pivotally coupled to a support member, such as a ground engaging stake, or the sidewall of a boat. The fishing rod is carried in a generally horizontal position on top of the rod retainer by a cup which receives the butt of the fishing rod and by a guide bar which supports and confines a forward portion of the fishing rod. The guide bar is spring biased for yieldably resisting downward movement relative to the rod retainer, thereby removing the weight of the fishing rod from the triggering mechanism.

The hook setting action is obtained by a tension spring coupled between the rod retainer and the support member. The rod retainer is held in a cocked position by a latch which is pivotally mounted on the support member. The latch is released by a trigger arm which is attached on one end to the guide bar and which is coupled at its opposite end to the latch. The trigger arm includes a cam for movably engaging the latch, and has an intermediate portion which holds the cam in a vertically offset and transversely extending position with respect to the guide bar whereby downward movement of the guide bar, in response to a strike, is converted into rotation of the cam against the latch.

A set screw is interposed between the latch and the rod retainer for manually adjusting the common area of engagement between the latch and the latch plate in the cocked position. Because of the mechanical advantage provided by the long trigger arm and its associated cam, the triggering force can be adjusted over a very wide range, thereby making the assembly compatible with both light and heavy tackle, for both stationary and trolling operations, and to accomodate the strike behavior of a particular type of game fish.

In an alternate embodiment, the fishing rod holder includes an elongated rod retainer which is pivotally coupled to a support member, and a guide arm which is pivotally mounted on the rod retainer. In this arrangement, the hook setting action is obtained by a tension spring coupled between the rod retainer and the support member. The rod retainer is held in a cocked position by a latch which is pivotally mounted on the support member. A latch spring is coupled between the latch and the rod retainer for biasing the latch for movement toward the cocked position. A cam is pivotally mounted on the guide arm and is movably engagable with the latch in the cocked position whereby the cam drives the latch toward the trip position in response to rotation of the guuide arm relative to the rod retainer.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawings.

BRIEF DESCRIPTION OF THE DRAWINGS

FIG. 1 is perspective view of a fishing rod holder having an automatic hook setting mechanism;

FIG. 2 is a left-side elevation view of the fishing rod holder of FIG. 1 in the cocked position;

FIG. 3 is a left-side elevation view similar to FIG. 2 which illustrates the released position of the fishing rod holder assembly;

FIG. 4 is a left-side elevation view of an alternate embodiment of a fishing rod holder;

FIG. 5 is a left-side elevation view which illustrates the released position of the fishing rod holder assembly of FIG. 4; and, FIG. 6 is a perspective view which illustrates the apparatus of FIG. 4 mounted onto a boat.

DETAILED DESCRIPTION OF THE PREFERRED EMBODIMENT

In the description which follows like parts are marked throughout the specification and drawing with the same reference numerals, respectively. The drawings are not necessarily to scale and in some instances portions have been exaggerated in order to more clearly depict certain features of the invention.

Referring now to FIG. 1, a fishing rod holder and automatic hook setting assembly 10 is mounted on an up-right stake or support post 12 which includes a tapered end 14 for penetrating the ground 16 adjacent a lake, river or other body of water. It should be understood that the rod holder and automatic hook setting mechanism of the invention can be used equally well when attached to the side of a boat. However, operation of the assembly, when attached to a boat, will generally become apparent from the following explanation of the ground based, stationary fishing assembly 10, and specific differences, if any, will be indicated.

The support post 12 is provided with a cross bar 18 by means of which the support post 12 is driven into the ground 16 by applying foot pressure. The support post 12 is preferably made of a heavy guage, galvanized steel. However, other materials such as wood or plastic may be used to good advantage.

Secured to the upper end of the support post 12 is a clevis 20 on which a rod retainer bar 22 is pivotally mounted for rotation about a pivot pin 24. The pivot pin 24 is received through the side of the rod retainer bar 22 at a position slightly off-center along its length. The shorter end of the rod retainer bar 22 is resiliently coupled to the support post 12 by a tension spring 26.

As illustrated in FIGS. 1 and 2, the assembly is in its cocked position, and the tension spring 26 is maintained under tension, ready to snap the rod retainer bar 22 from the slightly inclined position shown in FIG. 2, to a substantially inclined position as illustrated in FIG. 3, upon actuation.

The assembly is suitable for use with both light tackle and heavy tackle. For example, a light-weight spinning rod 28 of the type used in crappie fishing is shown having a butt hand-grip end 30 received within a cup 32. The cup 32 is rigidly supported above the rod retainer bar 22 by an end plate 34.

At the opposite end of the rod retainer bar 22 a guide bar 36 supports an intermediate or forward portion of the fishing rod 28. The forward end 38 of the rod is received within a yoke 40 which limits lateral movement of the rod assembly 28. Vertical movement of the rod assembly is limited by a retainer pin 42. The retainer pin 42 is easily removable, so that the rod assembly 28 can be quickly and easily set up after the bait has been cast.

The rod retainer bar 22 is held in the cocked position as shown in FIG. 2, in which the spring 26 is maintained under maximum tension, by a latch 44 which is pivotally coupled to the support post 12. Referring to FIGS. 1 and 2, the lower end of the latch 44 is coupled to a clevis assembly 46 by a pivot pin 48. According to this arrangement, the latch 44 is free to pivot about the pin 48 from the support post 12 upwardly toward the underside of the rod retainer bar 22. Formed in the opposite end of the latch 44 is a detent 50 which exposes a latching surface 52. Depending from the underside of the rod retainer bar 22 is a latch plate 54 having a latch engaging surface 56 onto which the latching surface 52 is engaged. Because of the force exerted by the spring 26, the rod retainer bar 22 is biased for movement in the clockwise direction, and this force is transmitted through the latch plate 54 to the latch 44 where it is reacted through the clevis 46 and support post 12. Thus, the assembly is in static balance as long as positive engagement is maintained between the latching surface 52 and the latch plate surface 56.

According to an important feature of the invention, the latch is tripped by an elongated trigger arm 58 which extends from the guide bar 36 downwardly to the detent region 50 of the latch 44. The upper end 60 is rigidly secured to the underside of the yoke 40 so that it is carried upwardly and downwardly with the yoke in response to reciprocal movement of the guide bar 36. The lower end 62 of the trigger arm 58 is extended substantially at a right angle with respect to the guide bar, and furthermore, it is vertically offset with respect to the guide bar by virtue of the angular displacement of the intermediate section 64, whereby reciprocal movement of the guide bar 36 is converted into rotation of the actuating end 62 against the detent 50.

Referring again to FIG. 1, the actuating end 62 preferably comprises a cam having a flat surface 66 for engaging the detent 50. Thus, as the guide bar 36 is moved downwardly in response to a strike, the cam flat surface 66 rotates against the detent 50, thereby displacing the latch surface 52 with respect to the latch plate surface 56.

Movement of the trigger arm 58 is stabilized by clevis plates 68, 70 which depend downwardly from the rod retainer bar 22 on opposite sides of the latch plate 54. The lower, right angle end 62 of the trigger arm projects through openings 72 formed in each clevis plate. The openings 72 are aligned with each other whereby the lower, right angle end 62 of the trigger arm can turn easily in response to up and down movements of the upper end 60 of the trigger arm. The upper end 60 of the trigger arm is preferably welded directly onto the yoke 40 in an offset position which does not interfere with up and down excursions of the guide bar 36.

The downward force exerted by the fishing rod 28 onto the guide bar 36 will vary depending upon the size and weight of the fishing rod and other tackle supported by the assembly. It will be appreciated that, although the downward force exerted by light tackle such as the spinning rod 28 is relatively small, because of the mechanical advantage afforded by the long trigger arm 58, even such a small force might be sufficient to cause an inadvertent triggering of the latch, especially when accompanied by loading induced by wave motion or by wind acting through the fishing line 74.

The weight of the fishing rod, whether it be light tackle or heavy tackle, and a predetermined amount of natural loading caused by wind or wave action, is relieved with respect to the triggering arm 58 by a coiled compression spring 76 which is interposed between the rod retainer bar 22 and the guide bar 36 for yieldably resisting downward movement of the guide bar relative to the rod retainer.

In the preferred arrangement, the guide bar has a lower portion 78 which extends downwardly through an opening in the rod retainer 22. The lower length 78 of the guide bar is encircled by the compression spring 76. Surrounding the compression spring and guide bar is a cylinder or sleeve 80. The lower end of the guide bar and the coiled compression spring 76 are confined within the sleeve, and the lower end 78 of the guide bar extends through an opening 82 in an end cap 84. The lower end of the guide bar is terminated by a bolt head 86. The bolt head 86 serves as a stop for limiting the upward movement of the guide bar 36. The spring 76 is compressed by a flange 88 or other stop means which is secured to an intermediate portion of the guide bar (FIG. 3). The intermediate portion of the guide bar is preferably threaded, and the stop member 88 is preferably is jam nut which is locked in place to provide an predetermined level of compression.

To operate the fishing rod holder 10, the assembly is set into the earth 16 at a convenient place adjoining a river, lake or other body of water. The rod retainer bar 22 is rotated upwardly to a position slightly elevated above the horizontal, and the latch 44 is rotated upwardly until there is positive overlapping engagement between the latching surfaces 52, 56. A set screw 90 is interposed between the latch and the rod retainer bar for manually adjusting the common area of engagement between the latch and the latch plate in the cocked position. The set screw has a slot which is easily engagable by a screwdriver, and this adjustment is carried out manually. The set screw 90 preferably intersects the latch 44 through the detent region 50 as can best be seen in FIG. 2. The set screw is, of course, threaded, and the opening through which it projects is also threaded. According to this arrangement the end of the set screw directly engages the end of the latch plate 54. However, other arrangements in which the set screw engages some other part of the rod retainer 22 or the support post 12 can be used to good advantage.

After the assembly has been cocked, with the desired amount of overlap between the latching surfaces established, the bait is cast and the reel drag is locked. Then the spinning rod is placed with its handle inside of the cup 32 and the retainer pin 42 is slipped away slightly to allow the intermediate portion 38 of the rod to rest within the yoke 40. The retainer pin 42 is then returned to its secured position in which the rod 38 is confined within the yoke. Thereafter, the assembly can be left unattended, as desired.

In response to a strike, the tip of the forward end 38 of the rod will be pulled downwardly, thereby displacing the yoke and guide bar 36 downwardly. Because the trigger arm 58 is securely fastened to the yoke 40, the upper end of the trigger arm 60 also moves downwardly. This downward motion is converted into rotary motion of the cam surface 66, which engages directly against the sloping surface of the detent 50. As the cam 64 rotates, the latch 44 is rotated downwardly, until the latching surface 52 no longer engages the latching surface 56, as shown in FIG. 3. When this occurs, the latch 44 rotates counterclockwise in the direction indicated by the arrow 92 while the handle end of the rod retainer bar 22 is suddenly driven downwardly in a clockwise direction as indicated by the arrow 94 in response to the pulling force developed by the tension spring 26.

At the same time, the force of compression in the compression spring 76 is being released, thereby driving the guide bar and the forward end of the fishing rod upwardly as indicated by the arrows 94. The forward end 38 of the fishing rod and the forward end of the rod retainer bar are also being moved with great force in a clockwise direction as indicated by the arrow 96. The sudden release of the latch 44 causes a strong setting force to be transmitted through the forward end of the fishing rod so that the fishing hook will be properly set. Moreover, the rod retainer bar 22 remains substantially elevated above its cocked position, thereby signalling that a strike has occurred.

Referring now to FIGS. 4 and 5, an alternate embodiment of the fishing rod holder and automatic hook setting assembly 10 is illustrated. This embodiment is similar to the embodiment shown in FIGS. 1, 2 and 3 insofar as it includes the upright support post 12 on which a rod retainer bar 22 is pivotally mounted. In addition, this assembly includes the latching member 44 which is pivotally mounted onto the upright support post. However, in this arrangement, the forward end 38 of the fishing rod 28 is supported by a guide arm 90 which is pivotally coupled to the rod retainer 22. According to a preferred embodiment, a latch block 92 is interposed between the guide arm 90 and rod retainer bar 22. The guide arm 90 is pivotally mounted onto the latch block 92 by a pin 94.

Secured to the forward end of the guide arm 90 is a clamp 96 which encloses and secures the forward end 38 of the fishing rod. The handle end of the fishing rod is received in and secured by a clamp 98 which is fastened to the opposite end of the rod retainer bar 22.

The rod retainer bar 22 is held in the cocked position (FIG. 4) in which the spring 26 is maintained under maximum tension by the latch 44. Latch 44 is biased toward the latched position by a latch spring 100. The latch spring 100 is secured at one end to the latch 44, and at its opposite end to the rod retainer bar 22. If desired, the opposite end of the latch spring 100 may be secured to the upper end of the support post 12. According to either arrangement, the latch 44 is free to pivot about the pin 48 from the support post 12 upwardly toward the underside of the guide arm 90. The spring 100 urges the latch 44 for clockwise movement as indicated by the arrow 102 into positive engagement with the latch block 92.

Formed in the forwardmost end of the latch block 92 is a detent 104 which exposes an inclined latching surface 106. The opposite end of the latch 44 is provided with a tang 108 which engages the latching surface 106 in the cocked position as shown in FIG. 4.

Depending from the underside of the guide arm 90 is a cam 110. The cam 110 is pivotally mounted to the guide arm 90 by a pivot pin 112.

Because of the force exerted by the latch spring 100, the latch 44 is biased for movement in a clockwise direction with the tang 108 engaging the latching surface 106 and simultaneously confining the cam 110 within the detent 104 against the end of the latch block 92. This force is transmitted through the latch 44, the latch block 92 and retainer bar 22 where it is reacted by the support post 12. Thus, the assembly is in static balance as long as positive engagement is maintained between the latching surface 106 and the tang 108.

The latch 44 is tripped by downward movement of the guide arm 90, which corresponds with a downward force transmitted through the fishing rod in response to a strike. As the guide arm 90 rotates counterclockwise as indicated by the arrow 114 in FIG. 4, the cam 110 rotates in a clockwise direction and moves along the inclined latching surface 106. As the cam 110 moves, it displaces the tang 108 along the latching surface 106. The common area of engagement between the tang and the latching surface steadily diminishes as the rod and guide arm rotate downwardly.

At the instant that the tang 108 clears the lip of the latch block 92, the tension spring 26 drives the retainer bar 22 and guide arm 90 in the clockwise direction as indicated by the arrows 116 in FIG. 5. The assembly is in static balance as long as positive engagement is maintained between the latching surface 106 and the tang 108 as illustrated in FIG. 4, but provides a sudden setting action when the latch is tripped, as illustrated in FIG. 5.

It will be appreciated from the foregoing description that the fishing rod holder assembly 10 is easy to construct and set up, and can be easily knocked down and folded with partial disassembly for convenient handling or shipment. Moreover, it is easily mounted onto a boat or other structure as illustrated in FIG. 6.

Although preferred embodiments of the invention have been described in detail, it should be understood that various changes, substitutions and alterations can be made therein without departing from the spirit and scope of the invention as defined by the appended claims.

What is claimed is:

1. A fishing rod holder comprising, in combination:
a support member;
a fishing rod retainer pivotally mounted on said support member;
a spring coupled between said support member and said rod retainer for biasing said rod retainer for rotational movement;
a latch pivotally mounted on said support member for movement from a cocked position is which it is disposed in latched engagement with said fishing rod retainer and wherein said spring is maintained in tension, to a trip position in which said latch is disengaged from said rod retainer and said spring tension is relieved;
a fishing rod guide bar coupled to said rod retainer for reciprocal motion transverse to said rod retainer; and,
a trigger arm rotatably coupled to said rod retainer and movably engagable on one end against said latch in the cocked position and carried on its opposite end by said guide bar.

2. The fishing rod holder as defined in claim 1, including a set screw interposed between said latch and said rod retainer for manually adjusting the common area of enagement between said latch and said rod retainer in the cocked position.

3. A fishing rod holder comprising, in combination:
a support member;
a fishing rod retainer assembly pivotally mounted on said support member;
a set spring coupled between said support member and said rod retainer for biasing said rod retainer for rotational movement;
a latch pivotally mounted on said support member for movement from a cocked position in which it is disposed in latched engagement with said fishing rod retainer assembly and wherein the set spring is maintained in tension, to a trip position in which said latch is disengaged from said rod retainer assembly and the tension in the set spring is relieved;
a latch spring coupled between said latch and said rod retainer assembly for biasing said latch for movement toward the cocked position;
a fishing rod guide arm pivotally mounted on said rod retainer assembly for rotational movement; and,
a cam pivotally mounted on said guide arm and movably engagable with said latch in the cocked position whereby said cam is operable to drive said latch toward the trip position in response to rotation of said guide arm relative to said rod retainer.

4. A fishing rod holder comprising, in combination:
a support member;
a rod retainer assembly pivotally mounted on said support member;
a first spring coupled between said support member and said rod retainer assembly for biasing said rod retainer assembly for rotational movement relative to said support member;
a latch pivotally mounted on said support member for movement from a cocked position in which it is disposed in latched engagement with said rod retainer assembly and wherein said spring is maintained in tension, to a trip position in which said latch is disengaged from said rod retainer assembly and said spring tension is relieved;
a fishing rod guide bar coupled to said rod retainer assembly for reciprocal motion transverse to said rod retainer;
a trigger arm rotatably coupled to said rod retainer assembly and movably engagable on one end against said latch in the cocked position; and,
a second spring mechanically coupled to said guide bar and said rod retainer assembly for yieldably resisting downward movement of said guide bar relative to said rod retainer assembly.

5. The fishing rod holder as defined in claim 4, said second spring being a coil spring, and said guide bar having a lower portion extending below the underside of said rod retainer assembly and having a rod guide portion projecting above said rod retainer assembly, said guide bar having a stop member secured to said lower guide bar portion, said fishing rod holder further including a tubular member secured to said rod retainer assembly, the lower portion of said guide bar extending axially through said tubular member, and said coil spring being received within said tubular member and engaging said stop member and said tubular member.

6. The fishing rod holder as defined in claim 4, said rod retainer assembly including a latch plate engagable by said latch, said latch plate having a latch engaging surface which extends transversely with respect to the longitudinal axis of said rod retainer.

7. The fishing rod holder as defined in claim 4, including a yoke attached to said guide bar, said trigger arm having one end secured to said yoke and an opposite end rotably coupled to said rod retainer assembly, said opposite end of said trigger arm having a cam for movably engaging said latch, and an intermediate portion holding said cam vertically offset and transversely extended with respect to said guide bar, whereby reciprocal movement of said guide bar is converted into rotation of said cam against said latch.

8. The fishing rod holder as defined in claim 7, said trigger arm comprising an elongated rod, and said cam being defined by a flat surface machined onto the end of said trigger arm which is rotatably coupled to said rod retainer assembly.

* * * * *